E. E. MAHER.
LOCK NUT.
APPLICATION FILED OCT. 1, 1912.
1,120,953. Patented Dec. 15, 1914.
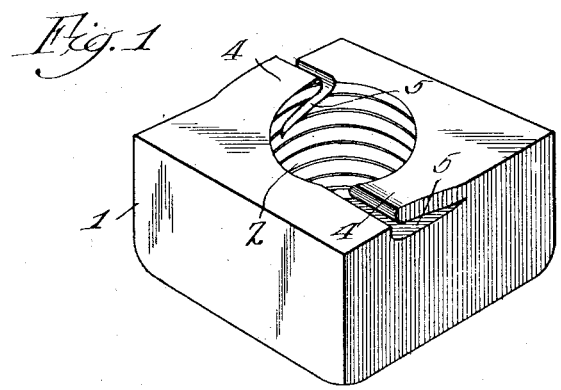
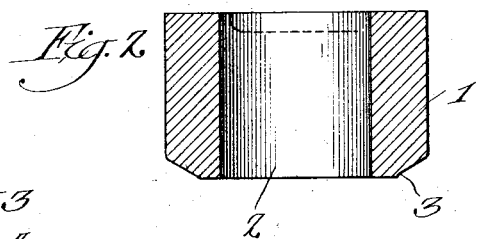
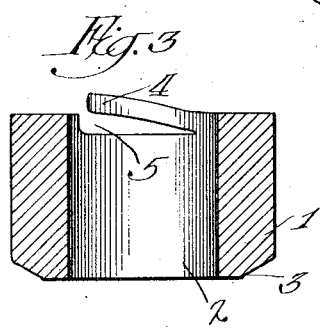
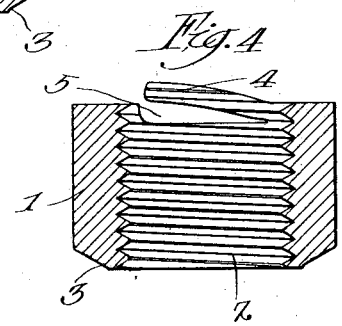
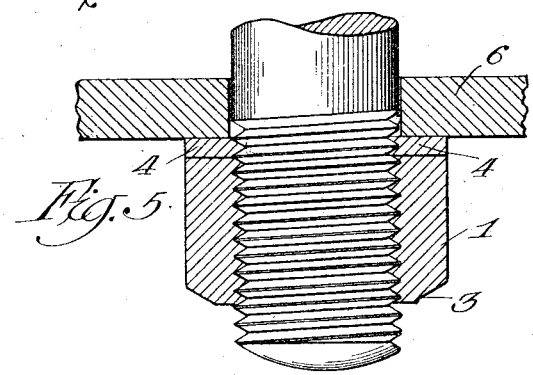
Witnesses:
Earl E. Howe
Robert S. McCready
Inventor:
Eugene E. Maher
by
Atty.

UNITED STATES PATENT OFFICE.

EUGENE E. MAHER, OF CHICAGO, ILLINOIS, ASSIGNOR TO K NUT CO., OF CHICAGO, ILLINOIS, A CORPORATION OF ILLINOIS.

LOCK-NUT.

1,120,953.  Specification of Letters Patent.  Patented Dec. 15, 1914.

Application filed October 1, 1912. Serial No. 723,311.

*To all whom it may concern:*

Be it known that I, EUGENE E. MAHER, a citizen of the United States, and a resident of Chicago, Cook county, Illinois, have invented certain new and useful Improvements in Lock-Nuts, of which the following is a specification.

My invention relates generally to nuts and has particular reference to nuts adapted to be locked in place upon bolts and other threaded members.

The general object of my invention is to provide an efficient one-piece lock nut of simple construction which can be manufactured at low cost, and which can be easily applied.

A further object of my invention is to provide a self locking nut of substantially the same dimensions as like size non-locking nuts, which will act automatically to lock itself against unintentional or undesirable rotation upon a bolt by engagement with a load surface, and which will maintain itself in locked position even irrespective of continued engagement with the load surface.

My invention consists generally in a self-locking nut of such form, arrangement of the portions, and distribution of the metal as will accomplish the aforementioned objects and other objects to appear hereinafter.

My invention will be more readily understood by reference to the accompanying drawings which illustrate the preferred form of my invention; and in which—

Figure 1 is a perspective view of a lock nut embodying my invention; Fig. 2 is a cross section through the nut in the process of manufacture; Fig. 3 is a cross sectional view illustrating a further step in the process of manufacture; Fig. 4 is a cross sectional view of the completely formed nut; and Fig. 5 is a sectional view illustrating my unique lock nut in engagement with a load surface and locked in position upon a bolt.

From my intimate acquaintance with the requirements of lock nuts both from the manufacturing standpoint and the locking standpoint, I have been able to devise a lock nut which is at once cheap to manufacture and efficient in locking capacity; which can be applied easily and quickly; and which requires substantially no more bolt length than is required for an ordinary standard nut having a like number of threads. I shall now describe in detail my improved lock nut which embodies these desirable features.

In the drawings 1 represents a nut body which may be sheared from a bar and if desired simultaneously provided with a bolt hole 2. I have depicted a square nut, but it should be understood that I may make my nut of any other desired out configuration. In Fig. 2 I have indicated my nut after it is severed from a bar and provided with a bolt hole. In the formation of the bolt hole a crown 3 is usually formed. This end of the nut is therefore unlevel and does not form a good frictional contact with a load surface. For this reason the crown is always considered as the top of the nut and almost any person in applying a nut unconsciously starts it on from the end opposite to the crown. In order that my nut may retain as many of the features of a standard commercial nut as possible, I prefer to retain the crown to designate the top of the nut and to form the locking portion of my nut in the opposite end.

In Fig. 3 of the drawing I have shown the locking portion in the process of forming. I strike up from the central portion of the nut two oppositely disposed wings 4—4. These wings are preferably slightly shorter than the diameter of the bolt hole. In striking up the wings 4—4 I preferably use a tool which will remove but little metal, and will separate the wing from the body of the nut by wedge-like recesses 5, 5. After the formation of the wings 4, 4, I thread the nut (as best shown in Fig. 4). The body of the nut now contains a number of regularly formed threads and the wing members each contain a portion of regularly formed threads. My nut can be locked in place upon the bolt or other threaded member by depressing or reforming the wings 4 to substantially the position they occupied before severance, that is, to the position indicated by the dotted lines in Fig. 2. In screwing the nut on a bolt the wings 4 first contact the load surface 6 and then as the nut is advanced on the bolt, the wings are depressed farther and finally take substantially the position shown in Fig. 5. In this position the threads of the locking wings 4 are forced into great frictional contact with the contiguous bolt threads and the nut is thereby held against unintentional and undesired rotation upon the bolt. My nut forms a perfect wrench fit and being perfectly threaded from face to face can be started on just as easily as an ordinary nut, that is, until the locking wings engage the load surface. To advance the nut farther considerable force is required, but this advancement can be quickly accomplished since it need move only a short distance. The resetting of the locking wings slightly distorts the bolt threads, in proportion to the separation of the wings from the nut body, but in no event do they so distort the bolt threads that the nut cannot be removed and both the nut and bolt used again.

I have shown in Fig. 5 my nut locked in position upon a bolt with the locking wings engaging the load surface 6. In certain classes of work it is desirable to provide a lock nut which will retain its locked engagement with the bolt irrespective of engagement with the load surface. The reason for this is that under certain conditions wherein there is great vibration and from other causes, the load surface recedes slightly from the nut even though the nut may initially have been screwed tightly against it. For this reason I prefer to make the metal of my nut such that when the wings are restored or depressed they will take a permanent set, that is, they will not spring back should the load surface recede. Hence my nut having been once firmly locked will retain this locked position until forcibly removed by means of a wrench.

A nut lock which may be ever so tightly locked at one point or side will, when subjected to incessant jarring or vibration, finally work its way off the bolt. This results from the fact that as the nut is locked only at one place there is a large free portion of the nut which is set in movement and which thereby creates forces acting to shift the position of the lock point. In my nut the wings being alternately disposed and oppositely arranged, the locking forces are equally effective on each side of the bolt. This alternate, opposite arrangement of the locking wings gives a certain balancing stability to the nut which prevents that tendency to jar loose which is found in nuts locked only at a single point or side. The wings are arranged with the free ends following the direction of rotation in screwing the nut on the bolt. The possibility of scoring the load surface is thereby minimized and the final setting of the nut facilitated.

It is evident that my nut lock as described attains the objects set forth in the opening of the specification, but I do not wish to limit my invention to the specific form and relative proportions of the parts shown because such modifications as fall within the scope of the appended claims may be made.

Having thus described my invention, I claim as new and desire to secure by Letters Patent:

1. A one-piece lock nut having a threaded bolt hole and two centrally arranged wing-like portions disposed on opposite sides respectively of the nut and flaring away from the load end of the nut in opposite directions, said wing-like members carrying portions of regularly formed threads and being adapted to be depressed for the purpose of locking the nut upon the bolt.

2. A one-piece lock nut having a bolt hole and two oppositely disposed wing members centrally arranged on opposite sides respectively of said hole and gradually flaring away from the end of the nut said bolt hole being threaded, said locking wings carrying portions of regularly formed threads and being adapted by engagement with a load surface to be restored to substantially preformed position and thereby to lock the nut upon a bolt.

3. A one-piece lock nut of substantially standard nut size having a threaded bolt hole, comprising a body portion and a locking portion, said locking portion consisting of two wing-like members centrally disposed on opposite sides respectively of the nut and forming a part of the threaded bolt circle, said locking wings flaring gradually away from the body portion in opposite directions, and being substantially tangential to the body portion at their juncture therewith.

4. A one-piece lock nut of substantially standard nut size comprising a body portion and a locking portion at the load end thereof, said locking portion consisting of two oppositely positioned wing-like members arranged at opposite sides respectively of the nut and extending in the general direction of the adjacent side and flaring gradually away from the body in opposite directions, a threaded bolt hole through the entire nut formed after the formation of the locking wings, said locking wings adapted by engagement with a load surface to be moved to substantially preformed position, as and for the purpose specified.

5. A one-piece lock nut of substantially standard nut size comprising a body portion and a locking portion, a bolt hole being formed in both portions, said locking portion comprising two relatively thin oppositely positioned wing-like members, flaring away from the body, the inner portions of the wings throughout their whole length serving to define a portion of the bolt hole, said locking wings being spaced from the body of the nut by substantially wedge-shaped recesses and said bolt hole being threaded after the formation of the wings.

6. A one-piece lock nut comprising a body portion and a relatively small locking portion, a bolt hole through both portions, said locking portion comprising two oppositely positioned centrally arranged and alternately disposed locking wings of less than nut side length, said locking wings bounding a part of the bolt hole, and being spaced from the body portion of the nut by substantially wedge shaped recesses which are substantially of knife edge width where the wings join the body, said bolt hole being threaded subsequent to the formation of the wings and said wings being adapted by engagement with the load surface to be restored to substantially preformed position and to lock the nut in position on the bolt irrespective of continued engagement with the load surface.

7. A one-piece lock nut comprising a body portion and a relatively small locking portion, a bolt hole through both portions, said locking portion comprising two centrally arranged oppositely positioned locking wings of less than bolt hole diameter, flaring gradually away from the body portion forming a substantially wedge shaped recess therewith and being substantially tangential to the body portion at their juncture therewith, the free ends of the locking wings extending in opposite directions, said body portion and locking wings being threaded after the formation of the locking wings and the locking wings being adapted by forceful engagement with the load surface to be depressed and thereby to lock the nut upon a bolt against undesired rotation.

In testimony whereof, I have hereunto set my hand this 28th day of September, 1912, in the presence of the subscribing witnesses.

EUGENE E. MAHER.

Witnesses:
 EDWARD F. WILSON,
 JOHN R. LEFEVRE.